May 11, 1943. C. V. SMITH 2,319,014
METHOD OF MOLDING
Filed Aug. 31, 1940
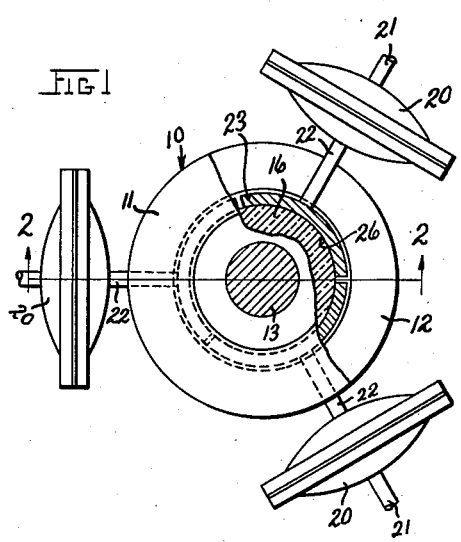
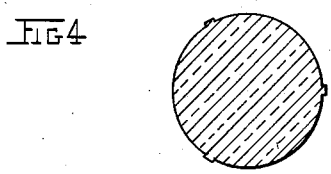
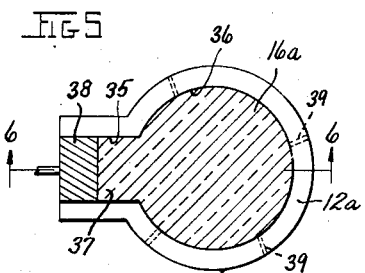
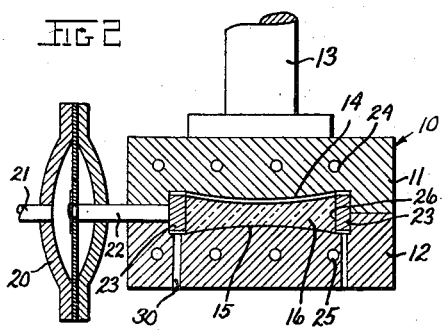
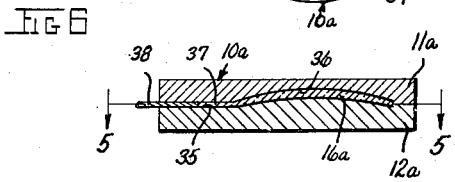
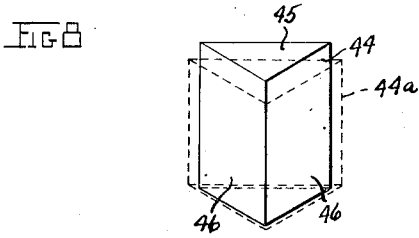
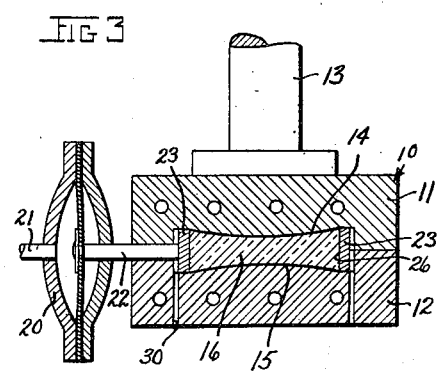
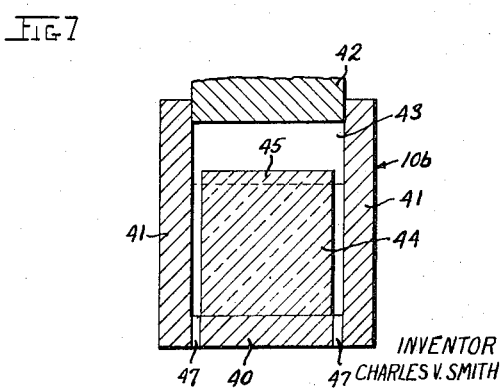
INVENTOR
CHARLES V. SMITH
BY
ATTORNEYS Patented May 11, 1943

2,319,014

UNITED STATES PATENT OFFICE 2,319,014

METHOD OF MOLDING

Charles V. Smith, Dayton, Ohio, assignor to The Univis Lens Company, Dayton, Ohio, a corporation of Ohio Application August 31, 1940, Serial No. 355,017

5 Claims. (Cl. 18—55)

This invention relates to a method for producing optical articles from resinous materials.

When producing optical articles from resinous materials the perfection of the surface of the article is of high importance. Also, the optical properties of the resinous material must be retained. The former methods of producing optical articles have not been entirely successful in that the finish upon the surface of the article was of insufficient optical perfection, and the optical properties of the article have been altered due to the formation process, particularly noticeable by the displacement of optical paths through the material resulting in bi-refringence.

In making lenses of high optical correction the mass of the resinous material moved to produce the lens may be relatively large, and as a result difficulty has been experienced in maintaining a surface finish upon the lens which is of sufficient perfection that the lens will not be impaired for optical use.

It is thus an object of this invention to provide a method for producing optical articles by which the mass of the material can be moved without causing undue surface movement of the material during the formation of the optical article.

It is another object of the invention to produce an optical article by positioning a blank of resinous material between surfaces of high optical perfection and to cause the blank to expand into engagement with the optical surfaces to reproduce the perfection thereof upon the blank.

It is another object of the invention to form an optical article from a blank of resinous material by causing the blank to be compressed in certain directions to permit expansion of the blank in other directions, which expansion will cause engagement of certain surfaces of the blank with optically finished surfaces whereby the optical finish of the surfaces will be imparted to the blank.

Another object of the invention is to expansion mold a blank of resinous material into an optical article by compressing the blank upon surfaces which need not be finished to cause other surfaces to be forced into engagement with surfaces of optical perfection to reproduce the same upon the blank.

A further object of the invention is to alter the physical shape of a blank of resinous material into an optical article in a manner that a minimum of surface movement is caused between the blank and the forming surface.

Another object of the invention is to form an optical article between surfaces of optical perfection which are arranged to be fixed in their relation with respect each other, and to cause the blank of resinous material to expand to conform with the configuration of the optical surfaces.

Another object of the invention is to position a blank of resinous material within a mold cavity of greater volume than the blank and to cause the blank to expand to fill at least a portion of the mold cavity to conform with the configuration thereof and impart an optical finish upon the surfaces of the blank adjacent the contacting surfaces of the mold.

Another object of the invention is to produce an optical article having determined dimensions between the optically finished surfaces thereof, the formation of the article being within or between optical surfaces having fixed dimensions therebetween.

A further object of the invention is to provide such an optical article of determined dimensions between optically finished surfaces, wherein the pressure compressing the article causing the expansion of the surfaces against optically finished surfaces will be retained upon the formed blank of resinous material while the same is set to hold the finished surfaces of the blank against the finishing optical surfaces.

Another object of the invention is to expansion mold a blank of resinous material into the form of an optical article between optically finished surfaces and to prevent air from being trapped between the optical finishing surface and the surface of the resinous blank.

A still further object of the invention is to preform a blank of resinous material into substantially the form of the finished optical article, and to impart optically finished surfaces upon the preformed blank by expansion molding the blank to cause engagement of certain surfaces thereof with surfaces of optical perfection.

Another object of the invention is to produce an optical article of determined thickness by expansion molding a blank of resinous material within a mold cavity of fixed dimensions.

Further objects and advantages will be apparent from the description and the drawing.

In the drawing:

Figure 1 is a top elevational view, partially in cross-section, of a mold and pressure mechanism for carrying out the purposes of this invention;

Figure 2 is a cross-sectional view taken along line 2—2 of Figure 1, showing the position of a blank within the mold prior to forming;

Figure 3 is a cross-sectional view similar to that of Figure 2 but showing the blank within the mold after the forming operation;

Figure 4 is a cross-sectional view of the optical article formed in the mold of Figures 1 to 3 inclusive;

Figure 5 is a cross-sectional view taken along line 5—5 of Figure 6, showing a modified arrangement for expansion molding an optical article;

Figure 6 is a cross-sectional view taken along line 6—6 of Figure 5;

Figure 7 is a cross-sectional view of a mold for producing a prism;

Figure 8 is a perspective elevational view of a blank of resinous material from which a prism can be formed, the final shape of the prism being shown in dotted lines.

When producing optical articles from resinous materials there are a number of factors which must be taken into consideration to prevent the optical properties of the resin from changing sufficiently as to destroy the optical properties of the article formed therefrom. This is particularly true with regard to lenses and, while more noticeable in lenses than in planos, yet the same destruction of optical properties will affect planos as well as lenses.

There are a number of substances available which have properties which permit it to be used in the production of unbreakable optical articles. These materials are particularly some of the synthetic resins which have indices of refraction which are not considerably different than the index of refraction of optical glass. Also, these synthetic resins are noted for their clearness and that they will pass substantially the same quantity of light as optical glass. Some of these resins are known to the trade by the names of Plexiglas, Lucite, Crystalite, and others, and being particularly of the group of organic resins which are produced by the polymerization of the monomeric derivatives of acrylic and methacrylic acids.

To produce optical articles in which the optical properties have not been impaired, particularly noticeable by bi-refringence, it is essential that the resinous material be manipulated in certain specific manners. I have found that all of the synthetic resins have a rate at which they can be deformed which will not produce the deleterious optical properties. I have also found that while the rate of deformation must be controlled, it is also of utmost importance that the surface movement of a blank of resinous material be retained to a minimum amount. The synthetic resins which are of particular value in optical work have considerable affinity for various other materials. This affinity causes the surface of the resinous blank to adhere to the surface of the die, which adherence, if forced to be broken, produces the deleterious optical properties within the finished product.

The usual procedure heretofore followed in producing unbreakable lenses, or optical articles from synthetic resins, has been to position a blank of the proper size and thickness within a mold or between surfaces upon which the proper optical curvature has been prepared. The resinous blank was heated either within the mold, or prior to insertion therein, and retained at molding temperature while within the mold. Pressure was then applied upon the mold causing the die halves to engage the heated blank of resinous material to deform the same into the configuration provided by the die surfaces. Since the die surfaces had been previously prepared with the proper optical curvature, it was assumed that the perfect optical article had been produced after the article was set since the curvature of the die surfaces had been imparted to the article.

I have found, however, that this is not a true condition, since the factors of rate of deformation and surface movement between the blank and die surface have not been given complete consideration.

I have found that when resinous material is worked in solid form by heating the same into a range of temperatures at which the material is capable of physical alteration that there is a definite rate at which the material can be deformed, and which rate, determined by the temperature at which the heated solid material is to be worked, cannot be exceeded if the deleterious optical properties are not to be produced.

These deleterious effects can be termed "optical strain" since they are not of sufficient value as to destroy the physical properties of the material. The optical strain produced within the optical article, due to formation, is of a definite determinable nature, the strain being such that the optical paths are displaced resulting in bi-refringence.

It is well-known that all plastics are characterized by what is known as plastic flow. This plastic flow is of a determinable character governed by the temperature of the plastic material. Plastic materials in solid form are also characterized by what is known as elastic deformation. This elastic deformation is that which will permit a solid plastic article to be deformed without causing plastic flow. There is a point, however, at which elastic deformation can no longer occur without waiting for plastic flow, after which the deformation turns into a definite rate. The plastic flow of the material can be forced to a certain extent. However, the rate at which this plastic flow can be forced is of a determinable order since there is a definite rate at which there occurs a physical degradation of the molecular structure of the material. If this plastic flow is forced at too great a rate, the rate of deformation will be such that optical strain is produced within the resinous material. The rate of deformation which produces this optical strain can be determined for each resinous material and for each temperature at which the material is to be worked. This rate of deformation cannot be set forth specifically since each resinous material will have a different rate of deformation due to the varying characteristics of the various materials. However, each material does have a definite rate of deformation below which optical strain is not produced.

The rate of deformation, which is insufficient to produce optical strain, will also safeguard the physical properties of the resinous material. If solid resinous materials are worked at too great a rate noticeable physical changes occur in the properties of the material, particularly characterized by loss of hardness, loss of resistance to chemical attack, loss of resistance to shattering, and the material being more susceptible to crazing. I have found that as long as the material is worked within the range which preserves the optical properties that these deleterious physical properties will not appear.

In addition to controlling the rate of deformation, when working solid synthetics, the degree of surface movement of the solid material over the surface of the die, also plays a definite role in producing optical strain. I have determined that, according to present knowledge, glass is the most satisfactory surface for producing a finish of high optical perfection upon synthetic materials. However, some of the synthetic materials, which have favorable optical properties, have considerable affinity for the glass. If the movement of the surface of the synthetic resin over the glass surface is sufficient, the adherence between the same will increase resistance to the flow of material during the formation whereby added force is required to break the adhesion between the glass surface and the resinous material. This adhesion and the necessity for added force to break the adhesion has caused the surface of the material to be moved at a rate greater than the rate allowed for movement of the material to prevent creation of optical strain.

The adhesion has also caused uneven internal flow of the resinous material. The surface of the mass of resinous material adheres to the glass surface to an extent that no appreciable surface movement is produced therebetween. Under these conditions the formation of an optical article takes place substantially entirely by internal movement of the mass. This results in the median portion of mass moving a greater distance than the portion adjacent the surface whereby greater internal strain is produced in the mass. While the rate of movement of the median portion of the mass can be controlled to prevent the production of optical strain, yet the control of the movement is difficult. The most satisfactory condition of mass movement exists when the entire cross-sectional area of the mass moves at a constant and equal rate.

In this invention, therefore, I provide a new method of molding solid synthetic resins into optical articles by causing the solid material to be expanded into engagement with surfaces of high optical perfection. The term "expansion molding" is used to indicate the manner of changing the physical shape of a solid synthetic plastic material in a manner whereby pressure is applied upon certain surfaces of the solid material. Other surfaces of the material are unconfined so that the pressure applied upon the certain surfaces will cause the other surfaces to expand outwardly from their normal position. It is the engagement of these surfaces, moved by expansion, with the optical surfaces that produce a surface upon the optical article of high optical perfection.

In practicing my invention, I provide a mold, or die, 10 having an upper die half 11 and a lower die half 12. The lower die half 12 may be supported upon any suitable stationary base, such as the base of an ordinary press. A plunger 13 engages the upper die half 11 and presses upon the same to hold the upper die half 11 in fixed engagement with the lower die half 12.

The upper die half 11 is provided with a surface 14 of optical curvature, while the lower die half 12 is provided with a surface 15 of optical curvature. The mold cavity provided between the optically curved surfaces 14 and 15 is arranged to receive a blank of resinous material 16. This blank of resinous material is in solid form and will be altered in shape while in the solid form, although elevated in temperature above normal room temperature.

The dies 11 and 12 are retained in closed position by the plunger 13. However, the plunger 13 exerts no pressure upon the dies 11 and 12 other than sufficient to retain the same in closed position while forming pressure is being applied upon the blank 16. To provide pressure upon the blank 16, I provide a plurality of power elements 20 which may be equidistantly spaced around the die 10. The power elements are provided with an inlet 21 connected to a suitable source of power, such as a fluid pressure source. A plunger 22 extends from each of the power elements 20 and is provided with an arcuate segment 23 on the end thereof. These segments 23 provide a substantially complete confining enclosure around the edge surfaces of the blank 16, when the same is positioned within the die cavity.

To form the blank 16 into an optical article, and in this particular case a lens, pressure is applied to each of the power elements 20, whereupon the plunger 22 forces segments 23 into engagement with the blank 16. Since all of the segments 23 are actuated simultaneously the center portion of the blank 16 will be forced outwardly into engagement with the arcuate surfaces 14 and 15 of the confining die halves 11 and 12. It will thus be seen that the blank 16 will be expanded when the pressure is applied to the edge surfaces thereof causing compression against the optical surfaces of the dies.

The rate at which this expansion is produced must be controlled to be below the rate which has been determined to be the proper rate at which the material can be deformed without producing deleterious optical strain. The rate, as aforementioned, is determined by the temperature at which the blank 16 will be worked. As a general rule, the rate of deformation increases as the temperature of the blank increases so that in order to deform the blank 16 at a rate which is practical for commercial purposes, the die halves 11 and 12 may be provided with heating passages 24 and 25 respectively. These passages, 24 and 25, can be used for both heating and cooling according to the cycle of operation.

As shown in Figure 2, the blank 16 is of less thickness than the dimension of the cavity between the optically curved surfaces 14 and 15. Under certain conditions this clearance may be of very small value whereby only a minimum amount of movement is required within the mass of the blank 16. While this method of expansion molding is applicable to cause complete formation of an optical article from a blank of synthetic resin, yet it may be of value to pre-form the blank prior the expansion molding step so that the contour thereof is substantially the contour of the optical article to be produced thereby. It will be understood, however, that the pre-formed article has been produced in a manner that deleterious optical strain is not present in the article at the time it is to be positioned within the die 10. When the article has been pre-formed, the purpose of the die 10 is to place a surface finish upon the optical surfaces of the pre-formed article.

There are always certain surfaces on optical articles which need not be finished, that is, they need not be finished to a surface finish of high optical perfection. In the instance of the blank 16, in the die 10 the edge surfaces 26 are the surfaces which need not be of optical perfection. The surfaces adjacent the optically curved surfaces 14 and 15 are the surfaces upon which a surface of optical perfection is required, as well as optical correction. The segments 23 may thus engage the edge surfaces 26 to cause the optical surfaces of the blank 16 to engage the finishing surfaces 14 and 15 of the dies 11 and 12 respectively. It is, therefore, practical to apply pressure upon the unfinished surfaces of the optical article to cause the finished surfaces to be expanded against optical surfaces of high optical perfection. As disclosed in Figure 3, the blank 16 has been formed in a manner that while the volume of the blank remains the same, yet the volume fills a definite portion of the die cavity to cause the surfaces of the blank to assume the configuration of the optical surfaces of the dies 11 and 12.

In this method of expansion forming of optical articles the movement of the mass of the material is relatively slight, particularly when the article has been pre-formed. It may well be seen that when pressure is applied to the edge surfaces of the blank 16 that the pressure, being equally distributed throughout the circumference of the blank, will transmit pressure substantially equally throughout the mass of the material whereby the optical surface of the blank will be expanded in a manner that one portion of the surface will contact the optical surface 14 of the die 11. Further movement of the point of contact of the blank 16 with the surface 14 will be prevented until other points are brought into engagement, the pressure being shifted from the various points of engagement until the blank 16 assumes the configuration of the surface 14, at which time the pressure of the power elements 20 will no longer cause further movement of the mass of the blank 16.

It is thereby seen that I have provided a method which alters the shape of a solid synthetic resin without requiring undue surface movement between the die surface and the blank. Since the surface movement is reduced to a minimum, the use of glass dies is entirely practical, the adherence of the resinous material to the die no longer producing defects since there is no requirement of substantial movement between surfaces.

The die 10 may be a closed die, as disclosed in Figures 1 to 3 inclusive, to seal foreign material from within the die cavity, or the die may be of an open type having limiting stops which pre-position the spaced relationship of the optically curved surfaces 14 and 15. By this method I am able to produce a lens of determined thickness, since I can bring the die halves 11 and 12 to a pre-determined fixed relationship. Subsequent setting of the blank 16, after formation, will not affect the accuracy of the optical article produced between the fixed dies 11 and 12 as would normally be considered, due to the contraction of the blank 16. Heretofore fixed dies have not been usable when producing optical articles due to the shrinkage in setting. However, since I apply forming pressure directly to the blank 16, rather than to the dies I am able to hold the blank 16 under pressure during the setting thereof, which holding pressure will cause the blank 16 to expand slightly to offset the normal shrinkage whereby the finished surfaces thereof will be retained against the optical surfaces of the die to retain their finished accuracy.

To prevent inaccuracy of contact between the optical faces of the blank 16 and the optically curved surfaces 14 and 15, I provide means to permit air trapped within the closed die 10 to escape. Such means may consist of small drilled openings 30 extending circumferentially around the edge of the die cavity. These passages 30 may either permit the air to be expelled due to the normal expansion of the blank 16, or may be connected to a source of vacuum which will insure the withdrawal of all air within the die cavity to prevent the creation of small dents in the surface of the finished lens.

In Figure 5, I show a modified arrangement for developing the pressure upon the blank of resinous material 16a. In this arrangement the die halves 11a and 12a are particularly arranged for the formation of a circular optical article, such as a lens. A passageway 35 extends from the cavity 36 of the die 10a. The blank 16a is provided with an extending portion 37 which extends within the passage 35. A plunger 38, connected to a suitable source of power, is adapted to press upon the extending end 37 of the blank 16a whereby pressure will be applied to the entire mass of the blank 16a to cause expansion of the same within the mold cavity 36. Suitable air bleeder holes 39 are provided around the circumference of the cavity 36 to permit entrapped air to escape from the cavity.

In Figures 7 and 8, I disclose an arrangement for producing prisms by the expansion molding process. In this arrangement, I provide a mold 10b having a closed bottom 40 and vertical side walls 41. The vertical side walls 41 are arranged to produce a triangle having the desired angles for the prism. Also, these walls 41 are provided with a finish surface on the interior surface thereof which is of high optical perfection. A plunger 42 extends within the triangular shaped mold cavity 43 for applying pressure upon a blank of resinous material 44.

The blank of resinous material 44 is of slightly smaller cross-section than will be the finished prism, the finished prism being indicated by dotted lines in Figure 8 and designated as 44a. The blank 44, however, is slightly longer than is the finished prism 44a so that when the blank 44 is inserted within the mold 10b a prism of determined length can be formed by compressing the blank 44 to cause the same to fill the entire mold cavity.

The end surfaces 45 of the prism 44 are not required to have a surface finish of high optical perfection, the surfaces 46 providing the optical surfaces of the prism. It may thus be seen that the prism may be formed in accordance with the general scheme of this invention in that the forming pressure is applied upon surfaces which are not required to have a high optical finish. The expansion of the blank of resinous material causing the surfaces, upon which a high optical finish is desired, to engage the finishing surfaces of the mold 10b.

Suitable holes 47 may be provided in the mold 10b to permit escape of entrapped air.

While I have disclosed the method of forming a single prism, yet the same general scheme can be followed to form a bar of prism material having the high optically finished surfaces, the bar being subsequently cut to provide prisms of any desirable length.

It is to be understood, of course, that the molds 10a and 10b can be heated and cooled in the same manner as described with regard to the mold 10. Also, the holding pressure may be applied upon the blanks of material within the molds 10a and 10b during the period the resinous blanks are being set to retain the finished surfaces thereof in engagement with the finishing surfaces of the respective molds.

I have not specifically described the molds as being constructed of any particular material. The essential requirement of a mold is that the surface of optical curvature be a surface which will impart an optical surface of sufficient perfection upon a blank of resinous material that the blank can be used for optical purposes. These mold surfaces can be made in various manners such as from hardened steel, or the surface may be plated, or the surface may be glass. In the case of metal, the surface shall be highly polished. This is also true of the glass, but at the present time I have found that polished glass produces the most perfect surface for optical purposes.

While the form and embodiment of the present invention has been described in connection with a specific apparatus, yet the invention is not limited to any specific form of apparatus but rather the scope of the invention shall include all devices falling within the purview of the claims.

Having thus fully described my invention, what I claim as new and desire to secure by Letters Patent is:

1. A method for forming an optically finished article from a blank of resinous material which consists in placing a blank of resinous material having major surfaces adapted to form the optical surfaces and minor surfaces adapted to form the non-optical surfaces of the finished lens between finishing surfaces of optical perfection of a mold, elevating the temperature of the blank, applying pressure to at least one of the non-optical surfaces of the blank substantially normal to said major optical surfaces while maintaining the finishing surfaces of the mold stationary, expanding said blank by said pressure on said non-optical surfaces of the blank to cause the blank to move in a direction normal to said mold optical surfaces and to impart the finishing effects of said mold optical surfaces to the optical surfaces of the blank.

2. A method for forming an optically finished article from a blank of resinous material which consists of placing a blank of resinous material having major surfaces adapted to form the optical surfaces, and minor surfaces adapted to form the non-optical surfaces of the finished lens between finishing surfaces of optical perfection of a mold, elevating the temperature of the blank, applying pressure to all of the non-optical surfaces of the blank, substantially normal to said major optical surfaces while maintaining the finishing surfaces of the mold stationary, expanding said blank by said pressure on said non-optical surfaces of the blank, to cause the blank to move in a direction normal to said mold optical surfaces and to impart the finishing effects of said mold optical surfaces to the optical surfaces of the blank.

3. A method for forming an optically finished article from a blank of resinous material which consists of placing a blank of resinous material having major surfaces adapted to form the optical surfaces, and minor surfaces adapted to form the non-optical surfaces of the finished lens between finishing surfaces of optical perfection of a mold, elevating the temperature of the blank, applying pressure to at least one of the non-optical surfaces of the blank substantially normal to said major optical surfaces while maintaining the finishing surfaces of the mold stationary, expanding said blank by said pressure on said non-optical surfaces of the blank to cause the blank to move in a direction normal to said mold optical surfaces and to impart the finishing effects of said mold optical surfaces to the optical surfaces of the blank, and holding the compression pressure upon the blank during the setting thereof to retain the same in setting condition to offset shrinkage due to setting.

4. A method for forming an optically finished article from a blank of resinous material which consists of placing a blank of resinous material having major surfaces adapted to form the optical surfaces of a predetermined optical curvature, and minor surfaces adapted to form the non-optical surfaces of the finished lens between finishing surfaces of optical perfection of a mold of the same optical curvature as said optical surfaces, elevating the temperature of the blank, applying pressure to at least one of the non-optical surfaces of the blank substantially normal to said major optical surfaces while maintaining the finishing surfaces of the mold stationary, expanding said blank by said pressure on said non-optical surfaces of the blank to cause the blank to move in a direction normal to said mold optical surfaces and to impart the finishing effects of said mold optical surfaces to the optical surfaces of the blank.

5. A method for forming an optically finished article from a blank of resinous material which consists of placing a blank of resinous material having major surfaces adapted to form the optical surfaces of a predetermined optical curvature, and minor surfaces adapted to form the non-optical surfaces of the finished lens between finishing surfaces of optical perfection of a mold of the same optical curvature as said optical surfaces, elevating the temperature of the blank, applying pressure to at least one of the non-optical surfaces of the blank substantially normal to said major optical surfaces while maintaining the finishing surfaces of the mold stationary, expanding said blank by said pressure on said non-optical surfaces of the blank to cause the blank to move in a direction normal to said mold optical surfaces and to impart the finishing effects of said mold optical surfaces to the optical surfaces of the blank, and holding the compression pressure upon the blank during the setting thereof to retain the same in setting condition to offset shrinkage due to setting.

CHARLES V. SMITH.